United States Patent [19]

Jacobs et al.

[11] Patent Number: 5,023,883
[45] Date of Patent: Jun. 11, 1991

[54] CONTINUOUS WAVE CHEMICALLY PUMPED VISIBLE ULTRAVIOLET LASER BASED ON CONTROLLED CONDENSATION

[76] Inventors: Theodore A. Jacobs, 4915 Loosestrife Ct., Annandale, Va. 22003; George Emanuel, 504 Willow Branch Rd., Norman, Okla. 73072

[21] Appl. No.: 412,421
[22] Filed: Sep. 26, 1989
[51] Int. Cl.$^5$ .......................... H01S 3/22; H01S 3/223
[52] U.S. Cl. .......................................... 372/56; 372/60
[58] Field of Search ...................... 372/56, 60, 61, 701

[56] References Cited

U.S. PATENT DOCUMENTS 4,434,492  2/1984  Benard et al. ......................... 372/56

OTHER PUBLICATIONS

Arai et al; "Effect of Iodine on the Laser Power . . . ", *IEEE J. of Quantum Electronics;* vol. 13, No. 6, Jun. 1877; pp. 405-407.
Borghi et al; "Supersonic Mixing Nozzle for Gas-Dynamic Lasers"; *Appl. Physics Letters;* vol. 22, No. 12, Jun. 1973; pp. 661-663.
Huestis, David L., Comment on "A Chemical Process Producing a Continuous Laser Amplifier In The Visible Region," *Chemical Physics Letter,* vol. 144, No. 4, Mar. 4, 1988, pp. 423-424.
Cobb et al., Continuous Chemical Amplification of Single- and Multi-Mode Lasers in the Visible Region, *Chemical Physics Letters,* vol. 156, No. 2, 3, Mar. 31, 1989, pp. 197-203.
Cobb et al., A Chemical Process Producing a Continuous Laser Amplifier in the Visible Region, *Chemical Physics Letters,* vol. 143, No. 3, Jan. 15, 1988, pp. 205-213.
Wellegehausen, B., Optically Pumped Alkali Molecule Lasers, *Metal Bonding and Interactions in High Temperature Systems,* Jan. 1982, pp. 461-486.
Wellegehausen, Optically Pumped CW Dimer Lasers, *IEEE Journal of Quantum Electronics,* vol. QE-15, No. 10, Oct. 1979, pp. 1108-1130.
Grohs et al., Gas Dynamics of Supersonic Mixing Lasers, *Handbook of Chemical Lasers,* Jan. 1976, pp. 263-388.
Emanuel, G., Numerical Modeling of Chemical Lasers, *Handbook of Chemical Lasers,* 1976, pp. 469-549.
Broadwell, J. E., Effect of Mixing Rate on HF Chemical Laser Performance, *Applied Optics,* vol. 13, No. 4, Apr. 1974, pp. 962-967.

OTHER PUBLICATIONS

List continue on next page.

*Primary Examiner*—William L. Sikes
*Assistant Examiner*—Robert E. Wise
*Attorney, Agent, or Firm*—Wigman & Cohen

[57] ABSTRACT

This invention discloses a system for generating a continuous wave (CW) chemically pumped laser in the visible and ultraviolet wavelength regions of the spectrum. This invention employs controlled condensation to produce a non-equilibrium species of metal atoms such as the sodium trimer ($Na_3$). Continuous, coherent radiation output is achieved by producing from a convergent divergent nozzle a high speed jet of metal vapor carrier by a non-reacting gas such as nitrogen ($N_2$). By control of the expansion rate and temperature of the metal vapor and carrier gas mixture, a metal trimer species is produced. Also from a convergent divergent nozzle a second high speed jet is produced that carries halogen atoms (such as fluorine, chlorine, bromine, or iodine) in an inert gas such as helium. The high speed jets of reactants flow in parallel. The two high speed jets of gases, alternating in halogen and metal vapor flow, output into a laser cavity. Upon mixing these gases, a chemical reaction results. As an example, bromine atoms react with $Na_3$. This reaction produces, among other products, $Na_2^*$, i.e., electronically excited sodium dimer in an inverted state. These excited, inverted state molecules are produced in an optical cavity whose axis is transverse to the flow. For $Na_2^*$, coherent radiation is produced at approximately 5270 Å in the visible spectrum. A laser is made to occur in the optical cavity; the product gases then quickly flow or are pumped out of the optical cavity.

57 Claims, 1 Drawing Sheet

Foust, Sodium Chemistry and Physical Properties, *Sodium-NaK Engineering Handbook*, vol. 1, 1972, pp. 8–10, 56–68.

Ewing, et al., Molecular Association in Sodium, Potassium, and Cesium Vapors at High Temperatures, *Physical Chemistry*, No. 71, 1967, pp. 473–477.

Sittig, Marshall, *Sodium Its Manufacture, Properties and Uses* Reinhold Publishing Corporation, 1956, pp. 237–259.

Durrant, P. J., *Introduction to Advanced Inorganic Chemistry*, Second Edition, John Wiley & Sons, Inc., 1979, pp. 453 and 684.

Wegener et al., Gasdynamics and Homogeneous Nucleation, *Advances in Colloid and Interface Science*, No. 7 (1977), pp. 325–415.

Emanuel, G., *Gasdynamics: Theory and Practice*, AIAA Education Series, NY, 1986, pp. 307–328.

Jensen et al., Prospects For Uranium Enrichment, *Laser Focus Magazine*, May 1976, pp. 51–63.

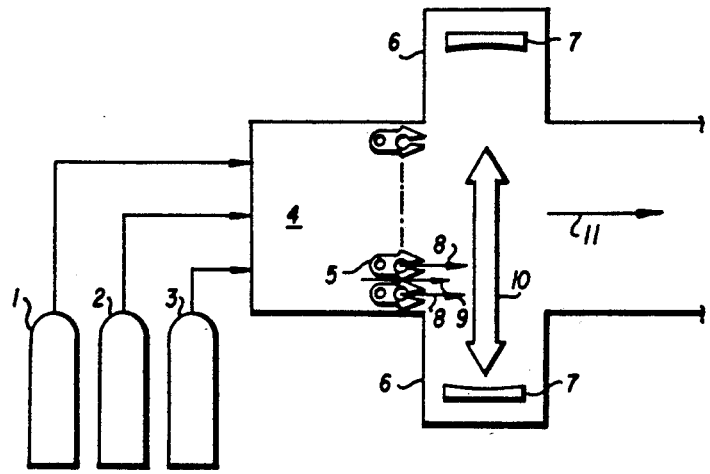

CONTINUOUS WAVE CHEMICALLY PUMPED VISIBLE ULTRAVIOLET LASER BASED ON CONTROLLED CONDENSATION

BACKGROUND OF THE INVENTION

Pulsed and continuous wave (CW) chemically-pumped lasers were invented in the 1960s. All currently known lasers of this class operate well into the infrared spectrum, a prominent example being the hydrogen-fluoride (HF) and deuterium fluoride (DF) lasers. Despite an intensive effort, however, the discovery of a chemically-pumped visible laser has eluded the research community. For example, Cobb et al, in Chemical Physics Letters, 143(3), pp. 205-213 (1988) has recently measured a positive value for the small signal gain on electronically excited diatomic sodium, $Na_2$, vapor. In Cobb, liquid sodium is vaporized in an oven with the vapor escaping through a small orifice into the very low pressure chamber of a molecular beam device. In the early part of the rapid vapor expansion, some of the sodium vapor in Cobb forms small molecular clusters. This polymerization process terminates in a vapor jet when the vapor density becomes too low for further collisions. A separate stream of monatomic halogen atoms is introduced into the low pressure chamber. A portion of these atoms becomes entrained in the sodium vapor jet and reacts with some of the sodium trimer molecules, thereby producing an electronically excited sodium dimer, $Na_2^*$. With this molecule as the upper state, a small positive gain was measured on a number of electronic transitions of the sodium dimer.

The Cobb experiment did not, however, produce a laser. Furthermore, a molecular beam device, as used by Cobb, cannot be used to generate an efficient laser, since a relatively small fraction, below 2%, of the sodium atoms are trimers. In addition, the halogen atoms cannot effectively penetrate much of the sodium vapor jet, thereby resulting in many sodium trimer molecules that pass through without reaction. There are other practical difficulties with the Cobb device, such as the $10^{-5}$ and $10^{-2}$ Torr pressure in the expansion chamber.

SUMMARY OF THE INVENTION

This invention comprises a new laser configuration that circumvents the difficulties associated with a molecular beam device. This invention efficiently produces a laser beam, at one or more visible or ultraviolet (UV) wavelengths, as a result of the pumping reaction $$Na_3 + X \rightarrow Na_2^* + NaX \qquad (1)$$

where X is a halogen atom, such as flourine, clorine, bromine, or iodine. This invention uses sodium for the metal vapor, although potassium, cesium, and others are alternative choices.

With this invention, a broad range of possible laser wavelengths in the visible, or near UV spectrum is feasible, due to lasing on a multiplicity of transitions and from possibly more than one electronic band. The actual lasing wavelengths and band systems with gain are, to a first approximation, determined by the particular choice of metal vapor and halogen atom. As indicated, sodium is but one of a family of possible metal vapors.

The efficiency of the proposed laser hinges on using separate converging/diverging nozzles for the streams containing the metal vapor and the halogen atoms. The metal vapor and halogen nozzles are quite small and are in close proximity. Many such nozzles could be used; they would constitute a nozzle array. A key element is the utilization of a metal vapor nozzle whose configuration would control the amount, cluster size, and location of metal vapor polymerization or condensation. In particular, it would maximize the sodium trimer formation inside the laser cavity, which is located just downstream of the exit plane of the nozzle array.

The technology being addressed differs from known technologies in the way excited $Na_2^*$ is produced. It differs from conventional chemical lasers in the lasing species and, most significantly, in the laser frequency region. In particular, it differs from Cobb in the way sodium or metal vapor is produced. It differs in the use of a controlled condensation process for the metal vapor. Finally, it differs by providing a synthesis with alternate approaches, for the design of a practical and efficient continuous wave chemically-pumped visible laser.

BRIEF DESCRIPTION OF THE DRAWINGS

The foregoing and other objects, features and advantages of the present invention will become more apparent in view of the foregoing and the accompanying detailed description of a preferred embodiment thereof as illustrated in the accompany drawing figures, in which.

DETAILED DESCRIPTION OF A PREFERRED EMBODIMENT

Figure 1:
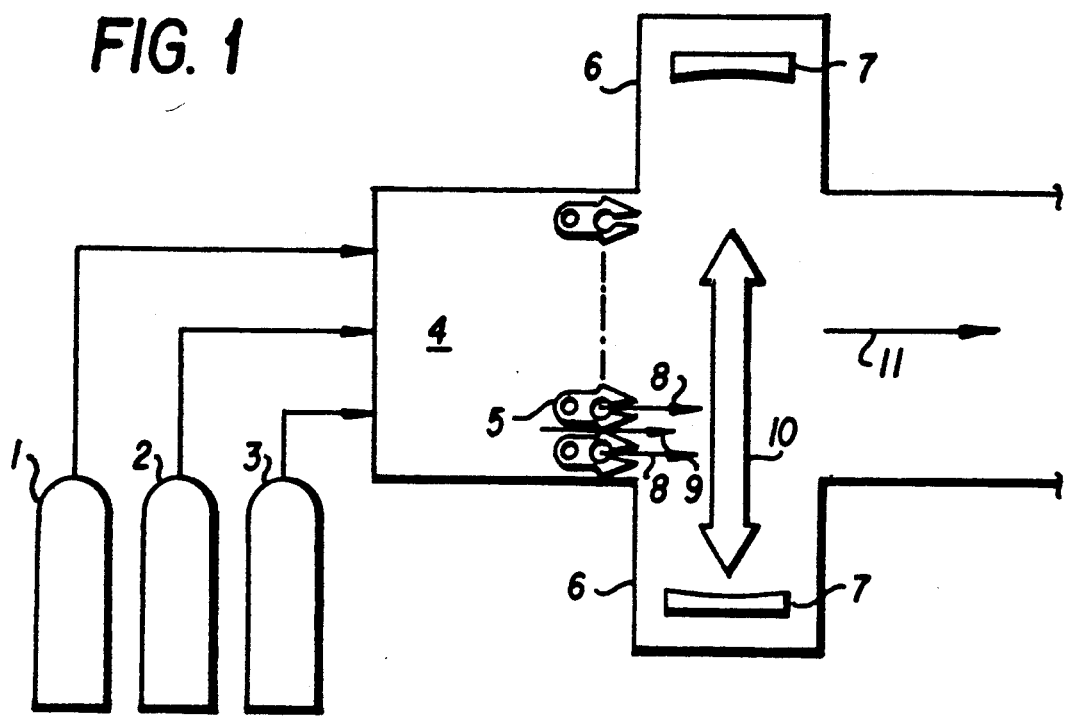
FIG. 1 shows a schematic illustration of the halogen atom introduction into a laser cavity.
Figure 2:
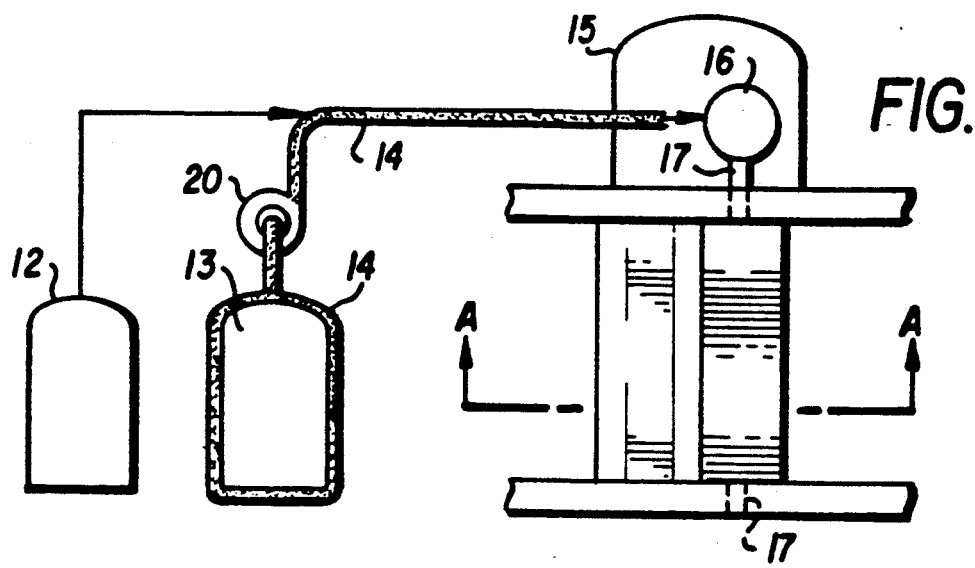
FIG. 2 shows a schematic of a sodium vapor system with a cross section (FIG. 2A) for one of the nozzle blades shown in FIG. 1 taken along line A—A of FIG. 2.
Figure 2A:
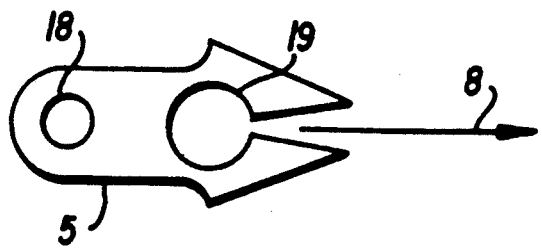

FIGS. 1 and 2 are schematic illustrations of an apparatus suitable for use in effecting the continuous wave visible-ultraviolet laser action of this invention. In this embodiment and its figures, sodium is used as a surrogate for any one of several possible metal species (cesium, potassium, argon, etc.) and fluorine is used as a surrogate for any one of several possible halogen (chlorine, bromine and iodine) species.

In FIG. 1, gases fluorine 1, hydrogen 2, and helium 3 are in containers and are mixed in cavity 4, which is a combustion chamber. This combustion chamber provides a hot gas consisting of fluorine, hydrofluoride, and helium molecules if 1 contains fluorine. If 1 contains nitrogen trifluoride, the mixture in combustion chamber 4 will also contain nitrogen. The proportions of fluorine (or nitrogentrifluoride) to hydrogen are such that excess fluorine occurs as fluorine atoms in combustion chamber 4. The pressure in 4 is well in excess of that in laser cavity 10. The hot gas from combustion chamber 4 passes through a nozzle array that consists of many so-called nozzle blades 5. The outer contour of nozzle blades 5 is shaped to provide a convergent/divergent passageway for the gas in combustion chamber 4. As a consequence, the gas in combustion chamber 4 enters the laser cavity 10 as a supersonic stream 9.

Laser action stems from the reactions $$Na_3 + F \rightarrow Na_2^* + NaF$$

$$Na_2^* + h\nu \rightarrow Na_2 + 2h\nu$$

where hν represents the visible/ultraviolet stimulated emission photon.

Referring to FIG. 2, liquid sodium is stored in container 13 at a temperature above its melting point of 371K. This storage is expedited by using an electrical heater covered with insulation 14. Pump 20 pumps the sodium vapor to a higher pressure where it can mix with nitrogen, bearing reference numeral 12. After mixing, the gas mixture enters the sodium distribution duct 16. The gas in duct 16 is heated to a temperature of about 1000K by any convenient thermal source 15. Source 15 might be electrical or hot gases produced by conventional combustion of air with hydrocarbon fuels. The hot sodium gas passes through a feed tube 17 to enter the plenum 19 of the convergent/divergent nozzle that is inside blade 5. If necessary, a second sodium system can be used to feed the nozzle 5 from the other end. In this case, a thermal source 15 is used for the heating stream containing sodium vapor. A distribution duct 16 is employed for the hot sodium vapor stream, and a feed tube 17 is used to feed each individualized sodium vapor plenum. The sodium vapor then emerges as a supersonic stream 8 into the laser cavity 10.

In cavity 10, the alternating fluorine and sodium supersonic streams mix and react to produce laser action. The laser beam occurs between two mirrors 7 contained in a vacuum enclosure 6 for the laser cavity and optical system. For an output beam, the mirror system requires modification to one that can outcouple the beam. After the lasing action terminates, the gas stream 11 proceeds to an exhaust system.

Section A—A in FIG. 2 shows the cross section of one of the blades 5. The dimensions in this cross section are typically small. It is important that the surface of the blade adjacent to the sodium vapor be above 371K in order to avoid condensing the vapor onto the wall. This condition can be met by fabricating the blade out of nickel or nickel alloy.

Halogen System

A more detailed description of the halogen atom system now follows. The halogen species (fluorine, chlorine, bromine and iodine) normally exist as diatomic molecules. These are dissociated into atoms in the plenum that feed a converging/diverging nozzle or nozzle array. This dissociation can be done in a wide variety of ways. Fluorine is used as a surrogate for any of the halogens. Fluorine can be dissociated by mixing it with a hot carrier gas, such as helium, nitrogen, or argon where the carrier gas is preheated by an arc, an electric heater, etc. Alternatively, fluorine atoms can be combustively produced by reacting an excess of fluorine with hydrogen. For ease in handling, the fluorine can be replaced by nitrogen trifluoride. To improve the mixing properties of the halogen jet in the laser cavity, it may be useful to include in the halogen stream a low molecular weight diluent, such as helium.

Fluorine may prove to be the halogen that results in the most efficient laser for several reasons. First, fluorine or nitrogen trifluoride ($NF_3$) dissociates at a relatively low temperature (about 1200K). Second, fluorine atoms are extremely reactive and should have a large reactive cross section with $Na_3$ and with $Na_2$ when $Na_2$ is in the lower laser level. The reaction rate with electronically excited $Na_2^*$ is much less important because of the competition with spontaneous and stimulated emission. These emission processes have very short lifetimes. Third, diffusional mixing on the microscale is more rapid with low molecular weight constituents, and fluorine atoms have the lowest atomic weight of the halogens.

The plenum pressure and nozzle area ratio for the halogen containing stream are chosen so that the nozzle exit pressure of the halogen stream approximately matches the nozzle exit pressure of the metal vapor to avoid thermal choking in the laser cavity. Thermal choking occurs if an average Mach number becomes unity in the cavity as a result of the various heat addition processes. As will be discussed, the metal vapor stream has a supersonic Mach number relatively close to unity. On the other hand, condensation and the other reactive processes in the laser cavity are not as exothermic as those that occur in the HF/DF laser. Furthermore, both the halogen and metal vapor streams will contain a heat absorbing diluent. Thus, a modest exit Mach number of about three for the halogen stream should suffice.

The physical size of both the halogen and metal vapor nozzles are roughly similar in size to the very small oxidizer and fuel nozzles of an HF/DF laser. This means that both the throat width (measured in the direction parallel to the optical beam) and the throat-to-exit plane distance are small. For example, a throat width of $10^2$ cm or less, and a throat-to-exit plane length of 0.3 cm or less, for the halogen nozzles is used with this invention. These dimensions were useful for the fluorine nozzles of an HF/DF laser. The metal vapor nozzle array is discussed later.

There are two basic reasons for use of very small nozzles. The first reason is common to both the halogen and metal vapor nozzles. (The second reason for the use of small metal vapor nozzles is discussed later). Small nozzles are needed to provide a rapid rate of mixing. This is essential since the halogen atoms cannot react with the metal vapor trimer molecules unless the two streams have, at least, been partially mixed. This mixing must occur before an appreciable fraction of the sodium vapor molecules have polymerized to $Na_n$ clusters where $n>4$. Thus, a Damkohler number that represents the ratio of the rate of formation of $Na_n$ clusters, $n>4$, divided by the rate of mixing between the halogen and metal vapor streams is important. Hereafter, this Damkohler number is denoted as K. For an efficient laser, K should be small. This implies that at the start of the laser cavity most of the metal vapor is in the form of monomer, dimer, or trimer molecules.

The rate of mixing can be enhanced with various trip devices that have been successfully utilized for the HF/DF laser, where a highly distorted laminar flow is obtained. At higher Reynolds numbers than usually occur in this laser, turbulence would occur. Regardless of whether a trip device is or is not used, the two streams must still mix on a microscale level where molecular diffusion is dominant. Fluorine atoms have a relatively low molecular weight, and the average halogen stream molecular weight can be further reduced with the use of helium diluent. The use of a low molecular weight diluent, i.e., helium, was found to be of considerable benefit in the HF/DF laser. In addition, the use of various inert diluents in the halogen and metal vapor steams is useful for the avoidance of thermal chocking and for moderating the temperature increase that occurs in the reacting gas stream as it flows through the laser cavity.

The discussion of mixing and the K parameter is especially important because a cavity pressure higher than a continuous wave HF/DF is expected.

Metal vapor System

Sodium is used as the surrogate for alternative metals such as potassium, cesium, and the like. Sodium has a low melting point temperature of 371K. Above this temperature, sodium is a liquid with a slowly increasing vapor pressure, $p_v$, given by $$\log_{10} p_v = 6.354 - \frac{556.7}{T} - 0.5 \log_{10} T \quad (2)$$

where $p_v$ is in atm and T is in Kelvin. At temperature levels near the melting point temperature, the vapor primarily consists of Na atoms. With increasing temperature, $Na_2$ dimers form in the saturated vapor, in accord with the equilibrium reaction $$2Na = Na_2 \quad (3)$$

The equilibrium constant $k_2$ for this process is $$k_2 = \frac{p_2}{p_1^2} \quad (4)$$

where $p_n$ is the equilibrium partial pressure, in atm, of the $Na_n$ polymer in the saturated vapor. In terms of temperature, $k_2$ is given by $$\log_{10} k_2 = -4.3249 + \frac{4002.3}{T} \quad (5)$$

At a relatively high temperature, the $Na_4$ tetramer starts to form, in accord with $$4Na = Na_4 \quad (6)$$

The equilibrium constant for this process is $$k_4 = \frac{p_4}{p_1^4} \quad (7)$$

where $$\log_{10} k_4 = -10.6798 + \frac{9069.4}{T} \quad (8)$$

Under conditions where $Na_2$ and $Na_4$ form in the vapor, a detectable amount of trimers has not been observed. Apparently, $Na_3$ is unstable under equilibrium conditions for the saturated vapor. However, $Na_3$ becomes stable when the vapor is supersaturated, a nonequilibrium condition.

Based on the foregoing relations, Table 1 shows the vapor pressure and mass fractions $f_n$ of $Na_n$ in the equilibrium saturated vapor. As is evident from this table, there is a substantial mass fraction of dimers at 900K and above. On the other hand, the mass fraction of tetramers is still small at 1300K.

TABLE 1

| \multicolumn{5}{c}{Vapor Pressure Of Saturated Sodium Vapor And Polymer $Na_n$ Mass Fractions} |
|---|---|---|---|---|
| T K | $p_v$ atm | $f_1$ | $f_2$ | $f_4$ |
| 900 | 0.0491 | 0.891 | 0.109 | 0.00009 |
| 1000 | 0.194 | 0.855 | 0.145 | 0.00048 |
| 1100 | 0.592 | 0.818 | 0.180 | 0.00182 |
| 1200 | 1.50 | 0.784 | 0.211 | 0.00541 |
| 1300 | 3.27 | 0.748 | 0.239 | 0.0132 |
| 1400 | 6.38 | 0.713 | 0.260 | 0.0274 |

TABLE 1-continued

There are a variety of ways of heating solid or liquid sodium to a temperature of about 1000K. Once the sodium is a liquid, for instance, it could be heated by any convenient high temperature external heat source while the sodium flows through a tube or series of tubes. One minor difficulty with this approach is that the sodium vapor may become superheated.

A second possibility is to use an exothermic reactive process, such as $$CO + \tfrac{1}{2} O_2 \longrightarrow CO_2 \quad (9)$$

However, CO, $O_2$, and $CO_2$ are reactive with sodium vapor, principal product of which being solid $Na_2O$. Any highly exothermic reactive system, which would heat and vaporize the sodium, would most likely also react with the sodium. It thus appears that the most practical way of providing saturated sodium vapor, with a temperature in the vicinity of 1000K, would be to externally heat it while it flows through tubes. Control of the heating process is required so that the vapor is saturated (not necessarily in the tubes) in the plenum of the metal vapor nozzles.

Control of the heating process, however, is not critical. In operation, the amount of heat would be gradually altered while monitoring the laser power or small signal gain. An optimum condition should occur when the power or gain is a maximum. The optimum plenum condition may, or may not, correspond to a saturated metal vapor state. At this time, only the saturated state is amenable to analysis; hence, it is used. Polyatomics will generally react with sodium. There appears to be one notable exception, namely, $N_2$. (Reactions will occur between $N_2$ and Na if an electric discharge is used.)

Condensation

The flow in the nozzle may consist of a pure vapor, say steam, or a vapor mixed with a non-condensing gas. In either case, the vapor becomes supersaturated as it flows through the nozzle. The degree of supersaturation is conveniently described by a parameter s, here defined as $$s = \frac{p_1}{p_v(T)} \quad (10)$$

where $p_v(T)$ is the equilibrium vapor pressure at temperature T, and $p_1$ is the actual, equilibrium or nonequilibrium, monomer partial pressure at the same temperature. Because of the presence of dimers and tetramers, s is slightly below unity in the metal vapor plenum. As the metal vapor stream flows through the converging-/diverging nozzle, both $P_1$ and $p_v$ decrease. A comparison of the $p_v$ and $f_1$ columns in Table 1 shows that $p_v$ falls more rapidly than does $p_1$. As expected, s increases as the metal vapor stream flows through the nozzle. An increasing s value means an increasing level of supersaturation.

In a conventional nozzle, condensation suddenly occurs in the diverging portion of the nozzle where the flow is supersonic and highly supersaturated. This process results in a so-called condensation shock wave of about 1 cm in thickness. Relatively little condensation or cluster formation occurs in the flow upstream of the shock. At the downstream end of the condensation shock, very little uncondensed vapor remains. At this downstream location, the vapor is primarily in the form of an aerosol, the particles each generally contain hundreds of monomer molecules. The s value at the onset of the condensation shock wave is typically about 10.

The condensation process is different, however, when a small minimum length nozzle (MLN), sometimes called a rapid expansion nozzle, is utilized. The rate of cooling, measured by [dT/dt], where T is temperature and t is time, is much larger for a MLN than for the conventional nozzles for two reasons. For a given throat dimension, an MLN provides the shortest length supersonic nozzle for a uniform exit flow at a prescribed Mach number. Thus the residence time in the nozzle is a minimum. The second reason is that for the proposed nozzle, the throat-to-exit size is very small. Again, the residence time of the molecules in the nozzle is very short. This second reason does not require a MLN.

Condensation can be qualitatively evaluated in a relatively small MLN, and downstream of it, by discussing measurements performed for a uranium enrichment process using a MLN followed by a long, slightly diverging duct. In this case, the plenumm temperature is room temperature. In one experiment, $SF_6$ plus diluent was cooled to 55K; in the other, $UF_6$ plus diluent was cooled to 50K. In each case, the measured spectra showed a pure monomer at the exit plane of the nozzle. At these low temperatures, the equilibrium vapor pressure of $SF_6$ and $UF_6$ is zero. Thus, the s parameter is effectively infinite at the exit plane. Moreover, spectroscopic measurements showed that condensation occurred quite gradually in the duct downstream of the nozzle. It is thus apparent that very large s values, without condensation, are possible and that a condensation process can proceed at a modest rate, in contrast to a condensation shock.

This invention differs from conventional nozzle technology in two major aspects. A very small nozzle, both in throat width and in its throat-to-exit length, is used for the metal vapor stream. This nozzle need not necessarily be of a MLN design. Secondly, the flow entering the nozzle already contains metal vapor polymers, especially dimers.

In this invention, two contrasting phenomena are present. The small scale of the nozzle inhibits condensation. On the other hand, the dimers, and to a lesser extent—because of their small number density—the tetramers, act as condensation centers that might enhance further condensation. As a consequence, a simple evaluation of K cannot be made. Because of the presence of dimers, it is expected that s should not be too large, e.g., much in excess of $10^2$. A value larger than $10^2$ may result in a substantial number of large polymers, and therefore a large value for K would occur. On the other hand, too small a value for s would result in too slow a rate for trimer formation, which is undesirable. In the next section the results of a wide ranging parametric analysis for the metal vapor nozzle is presented.

Analysis of the Metal Vapor Nozzle

A series of converging/diverging nozzle calculations were performed to obtain a first estimate of nozzle performance. The gas in the plenum is saturated sodium vapor consisting of monomers, dimers, and tetramers in accordance with Table 1. The model separately encompasses no diluent, a helium diluent, and a $N_2$ diluent. The diluent partial pressure in the plenum, in atm, is noted as $p_d$.

For simplicity, no further polymerization is assumed to occur inside the nozzle. Some polymerization will occur, however, although the amount is expected to be small. In particular, dimerization and trimerization, given by

$$2Na + M \rightarrow Na_2 + M \tag{11}$$

$$Na_2 + Na + M \rightarrow Na_3 + M \tag{12}$$

will occur, where M is any third-body collision partner. Reactions (11) and (12) are key steps that are essential for the laser process. These reactions are necessary in the laser cavity, and their occurrence inside the nozzle is favorable to the laser process.

The calculations to be discussed are designed to assess the effect of different diluent gases, the effect of varying the plenum stagnation temperature, and the effect of different values of the exit plane Mach number. The calculations utilize eqs. (2), (4), (5), (7), (8), (10), standard values for the gaseous specific heats and molecular weights of the various species, and the standard equations for a steady, one-dimensional nozzle flow. The perfect gas flow is assumed to be inviscid with a constant value for $\bar{\gamma}$, which is the ratio of specific heats of the mixture. Prescribed conditions consist of the diluent, i.e., its specific heat and molecular weight, its partial pressure in the nozzle plenum $p_d$, the nozzle plenum stagnation temperature $T_O$, and the exit plane Mach number M. In all cases, the metal vapor is sodium.

It is essential that the diluents should be inert with respect to the metal vapor and halogen atoms, have a relatively low molecular weight, and should not absorb the laser radiation. Both helium and $N_2$ fulfill this criteria.

Results are provided in Table 2, no diluent; Table 3, helium diluent; Table 4, $N_2$ diluent. The pressure p is the nozzle exit pressure and also characterizes the laser cavity pressure. Similarly, M and s are evaluated at the exit plane. The parameter $A/A^*$ is the inviscid area ratio for the diverging part of the nozzle. Table 4 also shows the molecular weight of the mixture, W, its average ratio of specific heats, $\bar{\gamma}$, and the static temperature T at the nozzle exit plane.

Table 2 shows that s is sensitive to M, increasing rapidly with M. The nozzle exit pressure is sensitive to $T_O$, increasing rapidly with $T_O$. There is a reasonable s value in case 124 but the exit pressure of 0.839 atm is too high for consideration. Furthermore, a nozzle with an area ratio of only 1.04 may not be practical, although cases 111 and 112 are otherwise satisfactory. The lack of practicality of a sonic, or near sonic, nozzle is not obvious. For example, thermal choking can be avoided if the halogen atom nozzle exit plane Mach number is sufficiently large.

TABLE 2

Metal Vapor Nozzle Performance - No Diluent

| Case | $T_O$ | M | s | p atm | A/A* |
|------|-------|------|--------|-----------|------|
| 100 | 900 | 1 | 33.5 | 2.43 − 2 | 1 |
| 101 | 1000 | 1 | 19.3 | 9.61 − 2 | 1 |
| 102 | 1100 | 1 | 12.2 | 0.295 | 1 |
| 103 | 1200 | 1 | 8.34 | 0.749 | 1 |
| 104 | 1300 | 1 | 6.02 | 1.64 | 1 |
| 110 | 900 | 1.25 | 272 | 1.75 − 2 | 1.04 |
| 111 | 1000 | 1.25 | 115 | 6.94 − 2 | 1.04 |
| 112 | 1100 | 1.25 | 57.3 | 0.213 | 1.04 |
| 113 | 1200 | 1.25 | 31.9 | 0.542 | 1.04 |
| 114 | 1300 | 1.25 | 19.4 | 1.19 | 1.04 |
| 120 | 900 | 1.5 | 3.71 + 3 | 1.23 − 2 | 1.15 |
| 121 | 1000 | 1.5 | 1.09 + 3 | 4.89 − 2 | 1.15 |
| 122 | 1100 | 1.5 | 401 | 0.150 | 1.16 |
| 123 | 1200 | 1.5 | 174 | 0.382 | 1.16 |
| 124 | 1300 | 1.5 | 85.6 | 0.839 | 1.16 |

Table 3 for helium diluent shows the same trends as in Table 2. In general, the nozzle exit pressure is too large as is s when M=1.5. The rapid increase in s with M is due to the rapid decrease in the nozzle exit temperature. In turn, this is caused by the relatively large value for $\overline{\gamma}$. With no diluent, $\overline{\gamma}$ is about 1.62; with helium diluent it is slightly larger.

TABLE 3

Metal Vapor Nozzle Performance - He Diluent

| Case | $p_d$ atm | $T_O$ K | M | s | p atm | A/A* |
|------|-----------|---------|------|-------|-------|------|
| 200 | 0.25 | 1100 | 1 | 13.7 | 0.417 | 1 |
| 201 | 0.25 | 1200 | 1 | 8.83 | 0.872 | 1 |
| 202 | 0.25 | 1300 | 1 | 6.20 | 1.77 | 1 |
| 210 | 0.25 | 1100 | 1.5 | 520 | 0.212 | 1.15 |
| 211 | 0.25 | 1200 | 1.5 | 198 | 0.444 | 1.16 |
| 212 | 0.25 | 1300 | 1.5 | 91.5 | 0.901 | 1.16 |
| 220 | 0.5 | 1100 | 1 | 14.6 | 0.539 | 1 |
| 221 | 0.5 | 1200 | 1 | 9.22 | 0.994 | 1 |
| 222 | 0.5 | 1300 | 1 | 6.36 | 1.89 | 1 |
| 230 | 0.5 | 1100 | 1.5 | 604 | 0.274 | 1.15 |
| 231 | 0.5 | 1200 | 1.5 | 220 | 0.506 | 1.15 |
| 232 | 0.5 | 1300 | 1.5 | 97.1 | 0.963 | 1.16 |

A more extensive set of computations is shown in Table 4, including W, $\overline{\gamma}$, and T. Because of the smaller $\overline{\gamma}$ value, nozzle exit conditions are decidedly more favorable. For example, cases 320 and 321 have appropriate s, p, M, and A/A* values. The pressure of $7.56 \times 10^{-2}$ atm in case 320 is higher than typically measured along the wall of a high-performance HF/DF laser. These wall pressure values, however, are not characteristic of the significantly higher pressure level along the center line of an HF/DF laser cavity. This pressure difference in and HF/DF laser is due to the Prandtl-Meyer expansions caused by the diverging cavity walls.

TABLE 4

Metal Vapor Nozzle Performance - N₂ Diluent

| Case | $p_d$ atm | $T_O$ K | M | s | p atm | A/A* | W kg/kmol | $\overline{\gamma}$ | T K |
|------|-----------|---------|------|-------|----------|------|-----------|------|-----|
| 300 | 0.25 | 950 | 1 | 6.05 | 0.186 | 1 | 27.0 | 1.38 | 797 |
| 301 | 0.25 | 1050 | 1 | 6.63 | 0.311 | 1 | 26.3 | 1.45 | 858 |
| 302 | 0.25 | 1150 | 1 | 6.76 | 0.619 | 1 | 26.1 | 1.50 | 918 |
| 310 | 0.25 | 950 | 1.25 | 18.2 | 0.136 | 1.05 | 27.0 | 1.38 | 731 |
| 311 | 0.25 | 1050 | 1.25 | 21.5 | 0.227 | 1.05 | 26.3 | 1.45 | 777 |
| 312 | 0.25 | 1150 | 1.25 | 22.6 | 0.450 | 1.04 | 26.1 | 1.50 | 825 |
| 320 | 0.25 | 850 | 1.5 | 80.7 | 7.56 − 2 | 1.18 | 27.7 | 1.35 | 611 |
| 321 | 0.25 | 950 | 1.5 | 72.7 | 9.63 − 2 | 1.18 | 27.0 | 1.38 | 663 |
| 322 | 0.25 | 1050 | 1.5 | 94.4 | 0.160 | 1.17 | 26.3 | 1.45 | 698 |
| 323 | 0.25 | 1150 | 1.5 | 104 | 0.317 | 1.16 | 26.1 | 1.50 | 734 |
| 330 | 0.5 | 800 | 1.5 | 98.6 | 0.142 | 1.18 | 27.9 | 1.34 | 580 |
| 331 | 0.5 | 850 | 1.5 | 72.8 | 0.146 | 1.18 | 27.8 | 1.34 | 615 |
| 332 | 0.5 | 900 | 1.5 | 58.8 | 0.153 | 1.18 | 27.7 | 1.35 | 647 |
| 333 | 0.5 | 950 | 1.5 | 52.5 | 0.166 | 1.18 | 27.4 | 1.36 | 675 |
| 334 | 0.5 | 1050 | 1.5 | 55.2 | 0.230 | 1.18 | 26.8 | 1.41 | 720 |
| 340 | 0.5 | 1000 | 1.75 | 247 | 0.131 | 1.39 | 27.1 | 1.38 | 631 |
| 350 | 0.75 | 800 | 1.5 | 97.1 | 0.212 | 1.18 | 27.9 | 1.34 | 581 |
| 351 | 0.75 | 900 | 1.5 | 54.8 | 0.223 | 1.18 | 27.8 | 1.34 | 649 |
| 352 | 0.75 | 1000 | 1.5 | 42.9 | 0.260 | 1.18 | 27.3 | 1.37 | 707 |
| 360 | 0.75 | 1000 | 1.75 | 190 | 0.179 | 1.40 | 27.3 | 1.37 | 640 |
| 370 | 0.75 | 1000 | 1.5 | 38.6 | 0.330 | 1.18 | 27.5 | 1.36 | 712 |
| 380 | 0.75 | 1000 | 1.75 | 165 | 0.227 | 1.40 | 27.5 | 1.36 | 645 |

In contrast to Tables 2 and 3, the pressure p is not as sensitive to $T_O$, see, e.g., cases 330–333. Also in contrast to Tables 2 and 3, the calculations indicate a minimum value for s with respect to $T_O$, with $p_d$ and M fixed, see cases 330–334. This minimum frequently occurred at a $T_O$ value at or near 1000K. Thus cases 340, 350, 360, 370, and 380 are all near the mimimum s value.

Both the halogen and metal vapor nozzles are small, thereby resulting in rather small characteristic Reynolds numbers for each type of nozzle. Thus, the viscous wall boundary layers tend to be laminar and may be of significant thickness by the exit plane of the nozzles. Therefore, the actual design of the nozzles should account for the displacement thickness of the boundary layers.

The wall temperature of the metal vapor nozzles should be kept above 371K to avoid any buildup of solid sodium on the walls. The halogen nozzles may require passivation if they are to be used with fluorine. The specific geometric contouring of the halogen or metal vapor nozzles is not of crucial importance, in part, because of their small size and the presence of laminar boundary layers.

Laser Cavity

The laser cavity starts just downstream of the exit plane of the halogen and metal vapor nozzles. Aside from wakes and boundary layers, the basic flow is supersonic. As a result of condensation and chemical reactions, some heat release occurs in the cavity. The effect of the heat release is not large because condensation is not a highly exothermic process. The heat release is also not large due to the relatively large fraction of chemical energy removed from the cavity by stimulated and spontaneous emission and by the presence of diluent gases. In addition, cavity temperature changes can be controlled by contouring the confining walls of the cavity as is done for the HF/DF laser.

The dominant physical and chemical processes that occur in the laser cavity will now be described. The metal vapor atoms, monomers and polymers, are in a supersonic jet at a relatively constant temperature, and a gradual condensation process occurs, in contrast to that in a condensation shock wave. Reactions (11) and (12) are dominant and highly desirable. A few larger polymers will also form in accordance with $$Na + Na_n + M \rightarrow Na_{n+1} + M, \quad n > 3 \tag{13}$$

$$Na_2 + Na_n + M \rightarrow Na_{n+2} + M, \quad n > 2 \tag{14}$$

where the collision partner M may not be necessary when n is sufficiently large. Polymers with $n \geq 4$ are not desirable since they remove sodium atoms and trimers that might otherwise contribute to the lasing process.

The next process is the mixing between the halogen and metal vapor streams or jets. This process is enhanced by using nozzles with small exit dimensions and gases with relatively low molecular weights. This aspect somewhat resembles the type of mixing that occurs in a supersonic HF/DF chemical laser cavity. The optimum rate of mixing is not a single number, nor, at this time, can it be established theoretically. However, it will depend on the rate of $Na_3$ formation and the rate needed for efficient removal, by reaction, of the de-excited $Na_2$ dimers. It will also depend on the rate of collisional deactivation of the electronically excited $Na_2^*$ dimer molecule. As discussed shortly, we do not expect this deactivation process to be dominant. Thus, a mixing process that extends over, say, ten or more centimeters may prove desirable.

The pumping reaction for the laser is Eq. (1). The laser process itself is provided by stimulated emission $$Na_2^* + h\nu \rightarrow Na_2 + 2h\nu \tag{15}$$

$h\nu$ represents a photon's energy and $2h\nu$ represents two coherently related photons of the same frequency. Since $Na_2$ may be in a variety of different lower level laser states, Eq. (15) may result in a variety of laser frequencies, all of which are in the visible or near UV spectrum.

The probability of stimulated emission, Eq. (15), is limited by two potential loss mechanisms. These are collisional or reactive deactivation and a relatively short spontaneous emission lifetime. Because the spontaneous and stimulated emission Einstein coefficients are proportional to each other, the per molecule small signal gain will be large when the radiative lifetime is short. Thus, the laser intensity in the cavity will be large and should result in a very efficient stimulated emission process that will dominate the foregoing loss mechanisms.

There are four processes by which there is removal of the lower laser level $Na_2$ from the laser cavity. First, there is convective removal by supersonic flow. Second, there are non-reactive collisions that change the internal state of the $N_a$. In particular, the nascent $N_a$ dimers may not be in their equilibrium rotational or vibrational states. Collisions with other atoms or molecules should enable these $Na_2$ dimers to change toward their equilibrium state. This later state depends on the temperature. Over a temperature range of 580–918K (see Table 4), this equilibrium state will vary considerably. Third, there are reactive collisions, such as $$Na_2 + X \rightarrow NaX + Na \tag{16}$$

where X is a halogen atom; The collisions are expected to be rapid, and thus efficient for removing the lower laser level. A sodium monomer is produced here that should prove useful in Eqs. (11) and (12). Other reactions besides (16) also may occur. Fourth, the nascent $Na_2$ may be in an electronically excited state. These excited states have short radiative lifetimes.

Thus, there are a variety of mechanisms for depopulating the lower laser level. Which of these are dominant will depend on the mixing rate, temperature, and density. At this time, there is no reason to believe the lower laser level will constitute a bottleneck, thus limiting the laser's efficiency.

This laser has the potential for being efficient with relatively little heat addition in the laser cavity. Thus, a relatively low supersonic Mach number for the metal vapor jets need not result in thermal choking. Furthermore, the initial Mach number for the halogen jets should equal or exceed 3. In addition, this laser may have a relatively long lasing zone length, perhaps in excess of 10 cm. This is advantageous from the point-of-view of the laser's optics, which would require active cooling.

Although the invention has been shown and described with respect to a best mode embodiment thereof, it should be understood by those skilled in the art that the foregoing and various other changes, omissions and deletions in the form and detail thereof may be made therein without departing from the spirit and scope of this invention.

What is claimed is:

1. An apparatus for generating a continuous wave chemically pumped laser, comprising:
    a means to produce a metal vapor contained in a nonreacting gas;
    a means to produce halogen atoms contained in an inert gas;
    a means operatively connected with said metal vapor production means for inputting said metal vapor into a laser cavity and for condensing the metal vapor so as to avoid condensation shocks; and
    a means for inputting said halogen atoms into said laser cavity, whereupon when said halogen atoms react with said metal vapor, a laser beam is produced in said laser cavity.

2. The apparatus of claim 1 further including a heating means operatively connected with said metal vapor production means for heating said metal vapor prior to its entry into said laser cavity.

3. The apparatus of claim 2, wherein said means for inputting said metal vapor into said laser cavity and for condensing the metal vapor so as to avoid condensation shocks comprises a first nozzle means and said means for inputting said halogen atoms into said laser cavity comprises a second nozzle means.

4. The apparatus of claim 3 wherein said first and second nozzle means have a convergent and divergent passageway.

5. The apparatus of claim 3 wherein said halogen atoms are formed by mixing a halogen with a gas constaining helium and a second gas in a chamber means located in proximity to said laser cavity.

6. The apparatus of claim 5 wherein said mixed gas in said chamber means enters said laser cavity in a supersonic stream.

7. The apparatus of claim 6 wherein said metal vapor enters said laser cavity in a supersonic stream.

8. The apparatus of claim 3 wherein said second gas contains hydrogen.

9. The apparatus of claim 3 wherein said chamber means contains a first pressure in excess of a second pressure in said laser cavity.

10. The apparatus of claim 1 wherein said inert gas contains helium.

11. The apparatus of claim 10 further comprising a hydrogen containing gas for mixing with a halogen.

12. The apparatus of claim 11 wherein said halogen is contained in a fluorine gas or nitrogentrifluoride gas.

13. The apparatus of claim 1 wherein said nonreacting gas contains nitrogen.

14. The apparatus of claim 1, wherein said means for inputting said metal vapor into said laser cavity and for condensing the metal vapor so as to avoid condensation shocks comprises a first nozzle means and said means for inputting said halogen atoms into said laser cavity comprises a second nozzle means.

15. The apparatus of claim 14 wherein said first and second nozzle means have a convergent and divergent passageway.

16. The apparatus of claim 14 wherein said first and second nozzle means are in close proximity and of a size such that a laser beam is produced in said laser cavity by the chemical reaction between said metal trimer and said halogen atoms.

17. The apparatus of claim 11 wherein said nozzle means has a throat width and a throat-to-exit plane length of approximately $10^{-2}$ cm and 0.3 cm respectively.

18. The apparatus of claim 17 wherein said first and second nozzle means contain an outer contour shape to provide a convergent/divergent passageway for the gas in said chamber means.

19. The apparatus of claim 14 wherein said first nozzle means is above a temperature value in order to avoid condensing the metal vapor onto a wall of said first nozzle means.

20. The apparatus of claim 14 wherein an exit pressure for said first nozzle means approximately equals an exit pressure for said second nozzle means to avoid thermal choking in said laser cavity.

21. The apparatus of claim 1 wherein said halogen atoms are formed by mixing a halogen with a gas containing helium and a second gas in a chamber means located in proximity to said laser cavity.

22. The apparatus of claim 1 wherein said laser beam is at one or more visible or ultraviolet wavelengths.

23. The apparatus of claim 1 wherein said laser cavity contains a vacuum and a plurality of mirrors contained therein and between which a laser beam is produced.

24. An apparatus for generating a continuous wave chemically pumped laser, comprising:
a means to produce a metal vapor contained in a nonreacting gas;
a means to produce halogen atoms contained in an inert gas;
a means operatively connected with said metal vapor production means for inputting said metal vapor into a laser cavity and for condensing the metal vapor so as to avoid condensation shocks, wherein a metal trimer is formed within said metal vapor; and
a means for inputting said halogen atoms into said laser cavity, whereupon when said halogen atoms react with said metal trimer, a laser beam is produced in said laser cavity.

25. The apparatus of claim 24 wherein said metal dimer is a sodium dimer.

26. An apparatus for generating a continuous wave chemically pumped laser, comprising:
a means to produce a metal vapor contained in a nonreacting gas;
a heating means operatively connected with said metal vapor production means for heating said metal vapor prior to its entry into a laser cavity;
a means to produce halogen atoms contained in an inert gas;
a means operatively connected with said metal vapor production means for inputting said metal vapor into said laser cavity and for condensing the metal vapor so as to avoid condensation shocks, wherein a metal trimer is formed within said metal vapor; and
a means for inputting said halogen atoms into said laser cavity, whereupon when said halogen atoms react with said metal trimer, a metal dimer is produced which generates a laser beam in said laser cavity.

27. An apparatus for generating a continuous wave chemically pumped laser, comprising:
a means to produce a metal vapor contained in a nonreacting gas, wherein said metal vapor is chosen from the group consisting of sodium, potassium, cesium and other alkali metals;
a means to produce halogen atoms contained in an inert gas;
a means operatively connected with said metal vapor production means for inputting said metal vapor into a laser cavity and for condensing the metal vapor so as to avoid condensation shocks, wherein a metal trimer is formed within said metal vapor; and
a means for inputting said halogen atoms into said laser cavity, whereupon when said halogen atoms react with said metal trimer, a laser beam is produced in said laser cavity.

28. An apparatus for generating a continuous wave chemically pumped laser at one or more visible or ultraviolet wavelengths comprising:
a first means to produce a halogen gas, a hydrogen containing gas and an inert gas;
a second means operatively connected to said first means to transport said halogen, hydrogen containing and inert gases into a chamber means wherein the gases are heated and mixed;
a third means to produce a metal vapor gas contained within a nonreacting gas;
a means to heat said metal vapor gas;
a means to pump, heat, and mix said metal vapor and nonreacting gases;
a first convergent divergent nozzle means to receive said mixed metal vapor and nonreacting gases and to output said metal vapor in a supersonic stream into a laser cavity, wherein said nozzle means is sufficiently heated to avoid metal vapor condensation and contains a throat and a throat-to-exit plane size such that metal trimers are formed in said laser cavity; and a second convergent nozzle means, which receives said mixed halogen, hydrogen containing and inert gases from said chamber means to output halogen atoms in a supersonic stream into said laser cavity wherein said metal vapor trimers mix with said halogen atoms to produce a metal dimer and a laser beam.

29. An apparatus for generating a continuous wave chemically pumped laser, comprising:
a means to produce a metal vapor;
a means to produce halogen atoms;
a means operatively connected with said metal vapor production means for inputting said metal vapor into a laser cavity and for condensing the metal vapor so as to avoid condensation shocks; and
a means for inputting said halogen atoms into said laser cavity, whereupon when said halogen atoms react with said metal vapor, a laser beam is produced in said laser cavity.

30. The apparatus of claim 29, further including a heating means operatively connected with said metal vapor production means for heating said metal vapor prior to its entry into said laser cavity.

31. The apparatus of claim 30, wherein a metal trimer is formed within said laser cavity, and further including a metal dimer formed by the reaction of said metal trimer with said halogen atoms.

32. The apparatus of claim 30, whereupon said means for inputting said metal vapor into said laser cavity and for condensing the metal vapor so as to avoid condensation shocks comprises a first nozzle means and said means for inputting said halogen atoms into said laser cavity comprises a second nozzle means.

33. The apparatus of claim 32, wherein said first and second nozzle means have a convergent and divergent passageway.

34. The apparatus of claim 32, wherein said halogen atoms are formed by mixing a halogen with a helium containing gas and a second gas in a chamber means located in proximity to said laser cavity.

35. The apparatus of claim 34, wherein said gases in said chamber means enters said laser cavity in a supersonic stream.

36. The apparatus of claim 32, wherein said chamber means contains a first pressure in excess of a second pressure in said laser cavity.

37. The apparatus of claim 31, wherein said first and second nozzle means contain an outer contour shape to provide a convergent/divergent passageway for said gas and said atoms in said chamber means.

38. The apparatus of claim 30, wherein said first and second nozzle means have a convergent and divergent passageway.

39. The apparatus of claim 29, wherein a metal trimer is formed within said laser cavity, and a metal dimer is formed by the reaction of said metal trimer with said halogen atoms.

40. The apparatus of claim 39, wherein said metal dimer is a sodium dimer.

41. The apparatus of claim 39, wherein an exit pressure for said first nozzle means approximately equals an exit pressure for said second nozzle means to avoid thermal choking in said laser cavity.

42. The apparatus of claim 29, wherein said metal vapor is chosen from the group consisting of sodium, potassium, cesium, and other alkali metals.

43. The apparatus of claim 29, further comprising an inert gas.

44. The apparatus of claim 43, wherein said inert gas contains helium.

45. The apparatus of claim 44, further comprising a hydrogen containing gas for mixing with a halogen and said inert gas.

46. The apparatus of claim 45, wherein said halogen is contained in a fluoride or nitrogentrifluoride gas.

47. The apparatus of claim 43, further comprising a nonreacting gas.

48. The apparatus of claim 47, wherein said nonreacting gas contains nitrogen.

49. The apparatus of claim 29, wherein said means for inputting said metal vapor into said laser cavity and for condensing the metal vapor so as to avoid condensation shocks comprises a first nozzle means and said means for inputting said halogen atoms into said laser cavity comprises a second nozzle means.

50. The apparatus of claim 49, wherein said metal vapor enters said laser cavity in a supersonic stream.

51. The apparatus of claim 49, wherein said first nozzle means is above a temperature value in order to avoid condensing the metal vapor onto a wall of said first nozzle means.

52. The apparatus of claim 49, wherein said first and second nozzle means are in close proximity and of a size such that a laser beam is produced in said laser cavity by the chemical reaction between a metal trimer and said halogen atoms.

53. The apparatus of claim 41, wherein said first nozzle means has a throat width and a throat-to-exit plane length of approximately $10^{-2}$ cm and 0.3 cm respectively.

54. The apparatus of claim 29, wherein said halogen atoms are formed by mixing a halogen with a gas containing helium and a second gas in a chamber means located in proximity to said laser cavity.

55. The apparatus of claim 54, wherein said second gas contains hydrogen.

56. The apparatus of claim 29, wherein said laser beam is at one or more visible or ultraviolet wavelengths.

57. The apparatus of claim 29, wherein said laser cavity contains a vacuum and a plurality of mirrors contained therein and between which a laser beam is produced.

* * * * *

UNITED STATES PATENT AND TRADEMARK OFFICE
CERTIFICATE OF CORRECTION

PATENT NO. : 5,023,883
DATED : June 11, 1991
INVENTOR(S) : THEODORE A. JACOBS et al It is certified that error appears in the above-identified patent and that said Letters Patent is hereby corrected as shown below:

Column 11, line 45, "hv represents" should be --where hv represents--;

Column 12, line 9, "atom; The" should be --atom; the--.

Claim 5, column 13, lines 2 and 3, "constaining" should be --containing--.

Claim 9, column 13, line 12, "claim 3," should be --claim 21,--.

Claim 17, column 13, line 38, "claim 11," should be --claim 14,--; and after "said" insert --first--.

UNITED STATES PATENT AND TRADEMARK OFFICE
CERTIFICATE OF CORRECTION

PATENT NO. : 5,023,883

DATED : June 11, 1991

INVENTOR(S) : THEODORE A. JACOBS et al

It is certified that error appears in the above-identified patent and that said Letters Patent is hereby corrected as shown below:

IN THE CLAIMS:

Claim 18, column 13, line 42, "claim 17," should be --claim 5,--.

Claim 28, column 15, line 5, after "convergent" insert --divergent--.

Claim 32, column 15, line 32, "whereupon" should be --wherein--.

Claim 37, column 15, line 51, "claim 31," should be --claim 34,--.

Claim 38, column 15, line 55, "claim 30," should be --claim 49,--.

UNITED STATES PATENT AND TRADEMARK OFFICE
CERTIFICATE OF CORRECTION

PATENT NO. : 5,023,883

DATED : June 11, 1991

INVENTOR(S) : THEODORE A. JACOBS et al

Page 3 of 3

It is certified that error appears in the above-identified patent and that said Letters Patent is hereby corrected as shown below:

Claim 41, column 16, line 5, "claim 39," should be --claim 49,--.

Claim 46, column 16, line 20, "fluoride" should be --fluorine--.

Claim 53, column 16, line 42, "claim 41," should be --claim 49,--.

Signed and Sealed this

Twenty-fourth Day of November, 1992

Attest:

DOUGLAS B. COMER

*Attesting Officer*  *Acting Commissioner of Patents and Trademarks*